United States Patent [19]

Itoh

[11] 4,005,769
[45] Feb. 1, 1977

[54] SEALING ARRANGEMENT FOR A SHOCK ABSORBER HAVING AN ANNULAR RESERVOIR

[75] Inventor: Hidekuni Itoh, Kasugai, Japan

[73] Assignee: Showa Manufacturing Co., Ltd., Tokyo, Japan

[22] Filed: May 30, 1975

[21] Appl. No.: 582,223

[30] Foreign Application Priority Data

Nov. 7, 1974 Japan .............................. 49-127502

[52] U.S. Cl. .................... 188/315; 188/322; 277/59; 277/74; 277/135
[51] Int. Cl.² .......................................... F16F 9/36
[58] Field of Search .................. 188/315, 269, 322; 267/64 R, 64 A; 277/70, 71, 72, 73, 74, 75, 76, 77, 78, 79, 59, 135

[56] References Cited

UNITED STATES PATENTS

| 2,090,621 | 8/1937 | Chisholm | 188/315 |
|---|---|---|---|
| 2,093,572 | 9/1937 | Padgett | 277/70 |
| 2,360,993 | 10/1944 | Whisler | 188/315 |
| 2,544,537 | 3/1951 | Levy | 277/59 |
| 2,737,384 | 3/1956 | Laugaudin | 267/64 R |
| 3,074,708 | 1/1963 | Lush et al. | 267/64 A |
| 3,076,643 | 2/1963 | Bittel | 267/64 A |
| 3,701,402 | 10/1972 | Chelnokov et al. | 188/322 |
| 3,804,217 | 4/1974 | Keijzer et al. | 188/322 |

FOREIGN PATENTS OR APPLICATIONS

| 825,969 | 3/1938 | France | 188/315 |
|---|---|---|---|
| 1,151,653 | 2/1958 | France | 188/322 |
| 627,170 | 8/1949 | United Kingdom | 188/315 |

*Primary Examiner*—Trygve M. Blix
*Assistant Examiner*—Edward R. Kazenske
*Attorney, Agent, or Firm*—A. W. Breiner

[57] ABSTRACT

An oil pressure shock absorber wherein an outer cylinder is coaxially fitted to the outside of an inner cylinder in which a piston having oil holes for generating a damping force is connected with the inner cylinder at the lower ends through oil holes and is fixed to the inner cylinder at the upper ends through a rod guide in which the piston rod is slidably fitted so as to be in sliding contact with the above mentioned piston rod so that an auxiliary seal and main seal of a resilient material tightly sealing the outer cylinder may be arranged in turn on the upper side of the rod guide. An annularly arranged oil reservoir is provided between the auxiliary seal and main seal and is connected with a gap enclosed with the piston rod and the main and auxiliary seals. Cuts to return the oil into the outer cylinder when the oil pressure in the oil reservoir has risen during operation are formed on the bottom surface of the oil reservoir in the auxiliary seal and an oil and high pressure gas are enclosed within the outer cylinder.

4 Claims, 3 Drawing Figures

SEALING ARRANGEMENT FOR A SHOCK ABSORBER HAVING AN ANNULAR RESERVOIR

An oil pressure shock absorber enclosing a high pressure gas is used as a suspending device for automobiles or autobicycles. In such shock absorber, a special high pressure seal having a complicated structure is required to prevent the leakage of gases. However, the price of fabrication is high and the operation when used on automobiles is so severe that the life is short and various troubles are likely to be caused. Therefore, there is mostly used a device wherein a free piston is provided and a high pressure gas is tightly enclosed between the free piston and the lower end of a cylinder. However, as a free piston is required, the shock absorber is complicated in structure and is troublesome to assemble.

An object of the present invention is to provide a double cylinder type oil pressure shock absorber wherein a high pressure gas can be tightly enclosed without requiring a costly high pressure seal or free piston.

Figure 1:
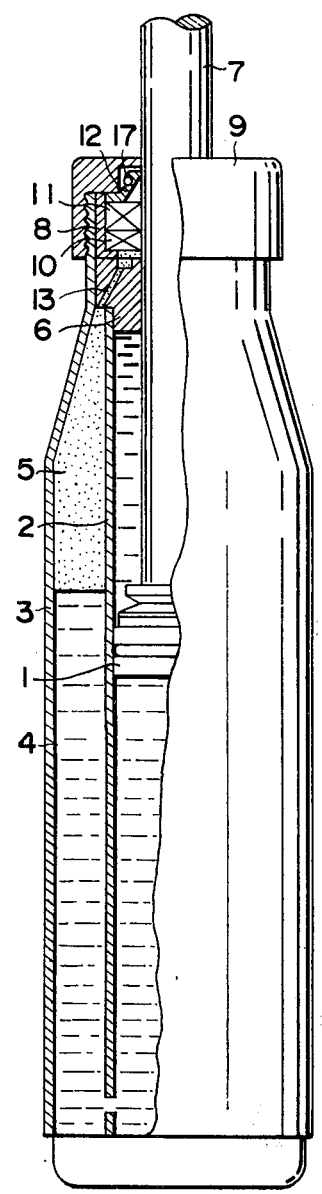
FIG. 1 is an elevation of an oil pressure shock absorber embodying the present invention with an essential part vertically sectioned.

An outer cylinder 3 is coaxially fitted to an inner cylinder 2 in which a piston 1 is slidably fitted and oil holes for generating a damping force and an oil passage having a check valve are provided at their lower ends and in the above mentioned piston to enclose an oil 4 and high pressure gas 5. A rod guide 6 is fitted to the upper ends of the above mentioned inner cylinder 2 and outer cylinder 3 to fix them. A piston rod 7 is slidably fitted through the rod guide 6. A seal case 8 is provided outside this rod guide 6 and is fastened with a lid body 9 screwed to the outer cylinder 6. An auxiliary seal 10, main seal 11 and dust seal 12 are contained in the seal case 8 and are arranged in turn from the rod guide 6 side. The rod guide 6 is provided with an oil hole 13 connecting between the inner cylinder 2 and outer cylinder 3 on the upper surface.

Figure 2:
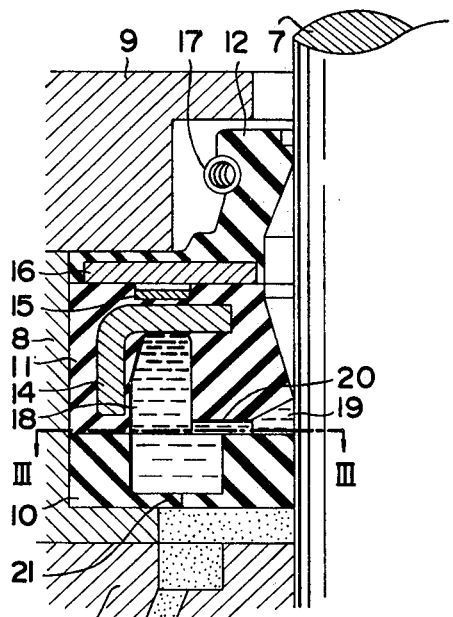
FIG. 2 is a magnified view of a part of the sectional view of FIG. 1.
Figure 3:
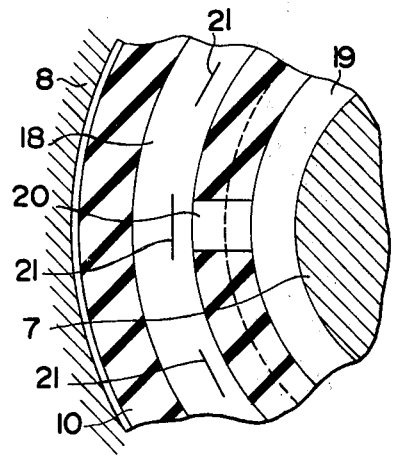
FIG. 3 is a sectioned view on line III — III in FIG. 2.

FIGS. 2 and 3 are magnified views of the part of the above mentioned seal case 8. Each of the seals 10, 11 and 12 is formed of such elastic body as rubber but the main seal 11 and dust seal 12 are provided with annular metal cores 14, 15 and 16 and the dust seal 12 is fitted with a fastening spring 17. Further, each of the above mentioned seals is in sliding contact with the piston rod 7. The main seal is especially strongly pressed in contact and the contact angle on the inside of the shock absorber is formed to be larger than the contact angle on the outside. The auxiliary seal 10 is in sliding contact with the piston rod with a pressure smaller than in the main seal and has a cylindrical contact surface. An annular concave groove is formed on each of the lower surfaces of the above mentioned main seal 11 and the upper surface of the auxiliary seal 10 to form an oil reservoir 18 annularly arranged intermediately between said seals. This oil reservoir 18 is provided with radial oil grooves 20 connected with an annular gap 19 enclosed with the piston rod 7, auxiliary seal 10 and main seal 11 and a plurality of cuts 21 formed to be opposed to the rod guide 6 on the bottom surface of the oil reservoir in the auxiliary seal 10.

When such double cylinder type oil pressure shock absorber operates, as shown in the drawing, the oil level in the inner cylinder 2 will rise but the oil level in the outer cylinder 3 will fall. Therefore, when the oil level in the inner cylinder 2 reaches the lower surface of the rod guide 6, the piston rod with a large amount of the oil deposited on it by the operation of the shock absorber will be inserted into the rod guide. Therefore, a large amount of the lubricating oil will be fed to the rod guide but the oil having passed through the sliding contact surface of the rod guide and piston will come into the gap 19 enclosed with said rod, auxiliary seal 10 and main seal 11 further through the sliding contact surface of the auxiliary seal 10 and piston rod 7. The oil having overflowed the gap 19 will be sent into the oil reservoir 18 through the oil grooves 20. Therefore, the gap 19 and oil reservoir 18 will be always filled with the oil and, when the oil pressure becomes higher than the pressure of the high pressure gas 5, the cuts 21 will be pushed open and the oil in the oil reservoir 18 will be returned into the gap between the inner cylinder 2 and outer cylinder 3 through the oil holes 13. Thus the gap 19 will be always filled with the oil and the contact angle inside the main seal is so large that the oil in the gap 19 will be prevented by the main seal from leaking out. That is to say, an annular oil layer will be formed on the peripheral side surface of the piston rod 7 and will be connected with the oil reservoir 18 of a capacity large enough to prevent oil breaks. Therefore, the leakage of the high pressure gas 5 in the upper parts of the inner cylinder 2 and outer cylinder 3 will be perfectly prevented by this oil layer. Further, in assembling the shock absorber, when the high pressure gas is enclosed in the shock absorber as vertically reversed to the state shown in the drawing, the oil reservoir 18 and gap 19 will be filled with the oil in advance and therefore, even before the operation of the shock absorber, the high pressure gas will not be likely to leak.

As described above, in the oil pressure shock absorber of the present invention, the leakage of the high pressure gas can be prevented by the main seal and auxiliary seal of simple structures made of elastic bodies. Therefore, this shock absorber can be manufactured at a low cost and the structure of the sealing part is so simple that the shock absorber is not likely to fail and has a long life.

What is claimed is:

1. A sealing arrangement for a shock absorber comprising an inner cylinder having first and second ends and defining an inner working chamber in which a piston for generating a damping force is slidably fitted, an outer cylinder having first and second ends and spaced coaxially from said inner cylinder to define a first annular oil and high pressure gas reservoir between said inner and outer cylinders, said inner cylinder having at least one hole therethrough near the second end thereof to allow fluid communication between said inner chamber and said first reservoir, a piston rod secured to said piston and extending outwardly of the first end of said inner and outer cylinders, said second end of said inner and outer cylinders being closed, a rod guide secured to the first end of said inner and outer cylinders and in sliding contact with said piston rod, an auxiliary sene and main seal arranged above said rod guide and tightly sealing the first end of said outer cylinder and in sliding contact with said piston rod, a second annular oil reservoir provided between said main and auxiliary seal, a gap defined between said main and auxiliary seals and enclosed by said piston rod, main seal, auxiliary seal, and said second reservoir to allow fluid communication between said rod and said second reservoir, and cuts formed through a bottom surface of said auxiliary seal to return oil from said second reservoir to said first reservoir when the oil pressure in said second reservoir has risen above the pressure of said high pressure gas in said first reservoir during operation of said shock absorber.

2. A sealing arrangement according to claim 1 wherein a dust seal of an elastic material is further provided above said main seal; annular metal cores are provided in said main seal and dust seal and a fastening spring is fitted to said dust seal.

3. A sealing arrangement according to claim 1 wherein said main seal is pressed in contact with the piston rod more strongly than the other seals.

4. A sealing arrangement according to claim 1 wherein said cuts are annularly formed at spaced intervals along the bottom surface of said auxiliary seal.

* * * * *